Oct. 24, 1933.　　　J. A. PROCTOR　　　1,931,680
RADIO DIRECTION FINDER
Filed May 11, 1928　　　9 Sheets-Sheet 1

Inventor:
John A. Proctor
By his Attorney
Philip Farnsworth

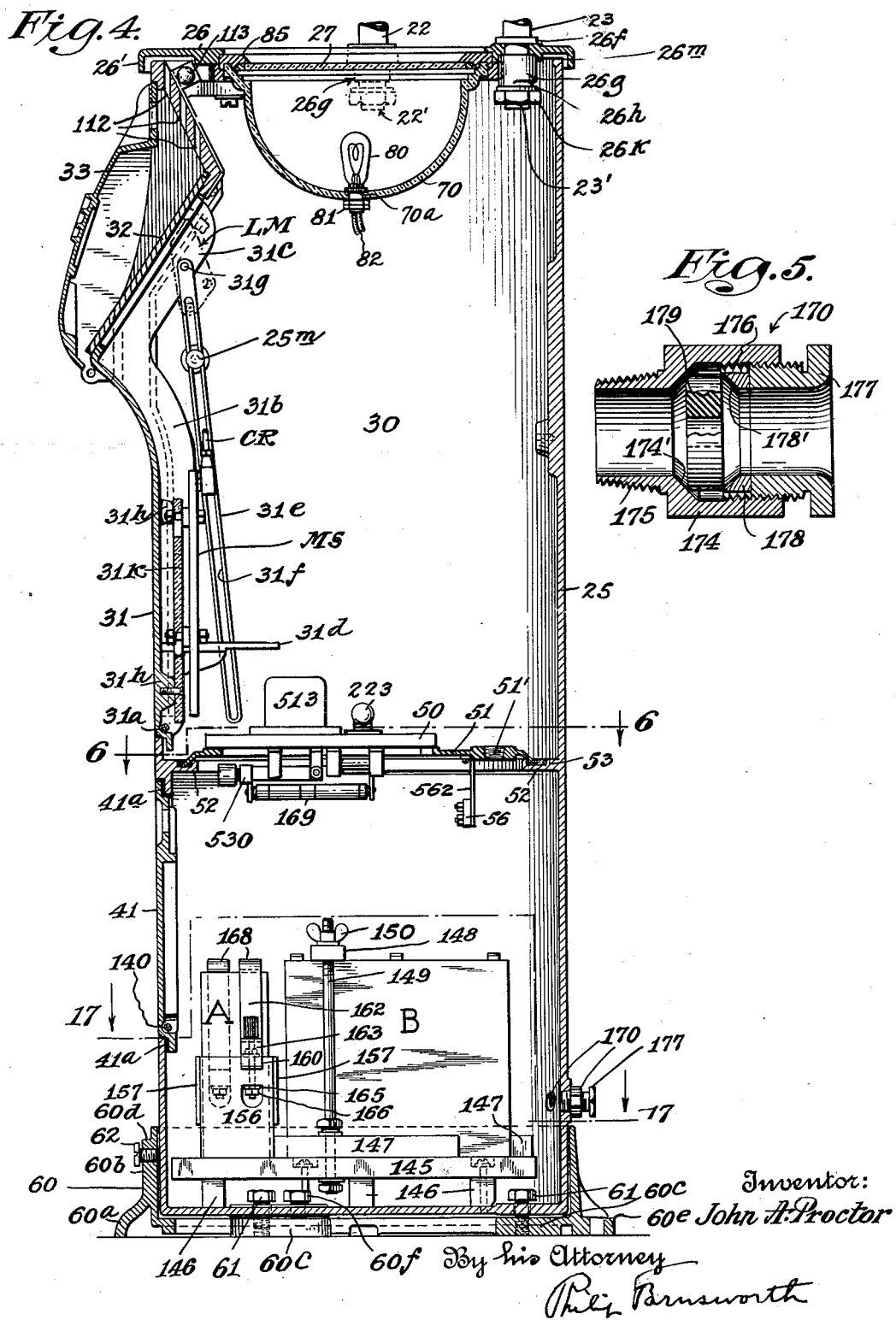

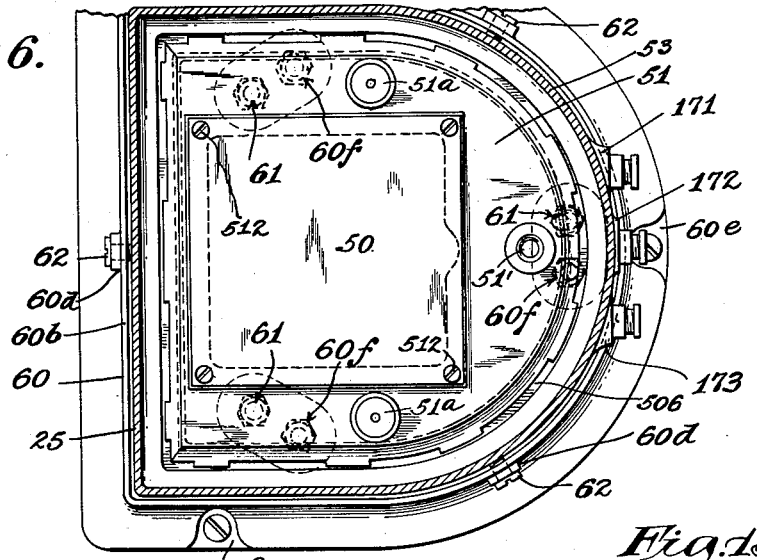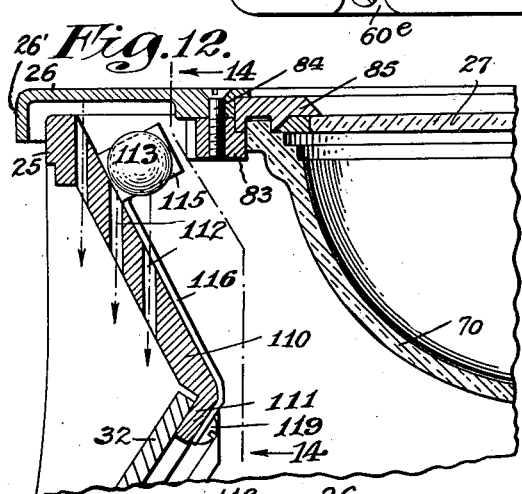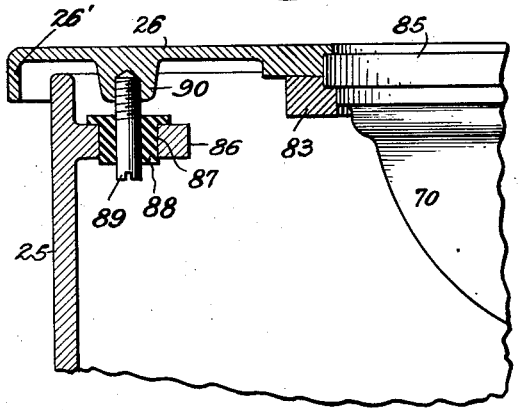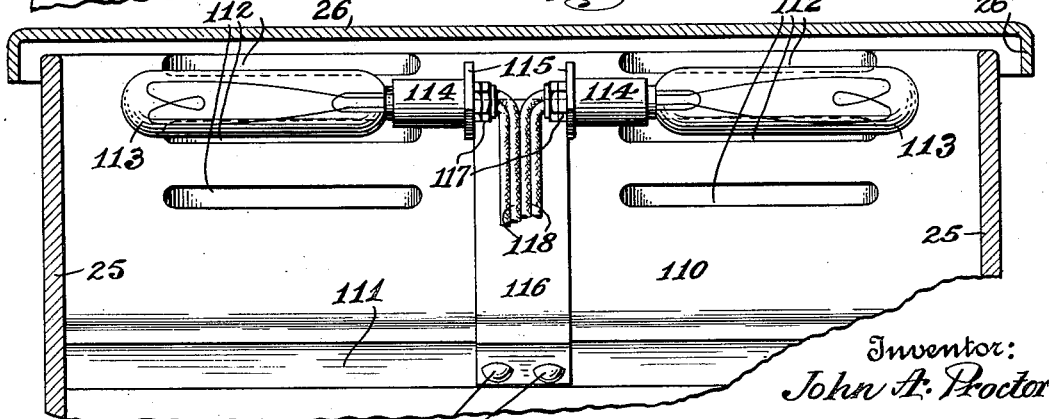

Oct. 24, 1933.  J. A. PROCTOR  1,931,680
RADIO DIRECTION FINDER
Filed May 11, 1928    9 Sheets-Sheet 4

Inventor:
John A. Proctor
By his Attorney
Philip Barnsworth

Oct. 24, 1933.  J. A. PROCTOR  1,931,680
RADIO DIRECTION FINDER
Filed May 11, 1928   9 Sheets-Sheet 5

Inventor:
John A. Proctor
By his Attorney

Oct. 24, 1933.    J. A. PROCTOR    1,931,680
RADIO DIRECTION FINDER
Filed May 11, 1928    9 Sheets-Sheet 6

Inventor:
John A. Proctor
By his Attorney
Philip Farnsworth

Oct. 24, 1933.  J. A. PROCTOR  1,931,680
RADIO DIRECTION FINDER
Filed May 11, 1928  9 Sheets-Sheet 7

Inventor:
John A. Proctor
By his Attorney
Philip Farnsworth

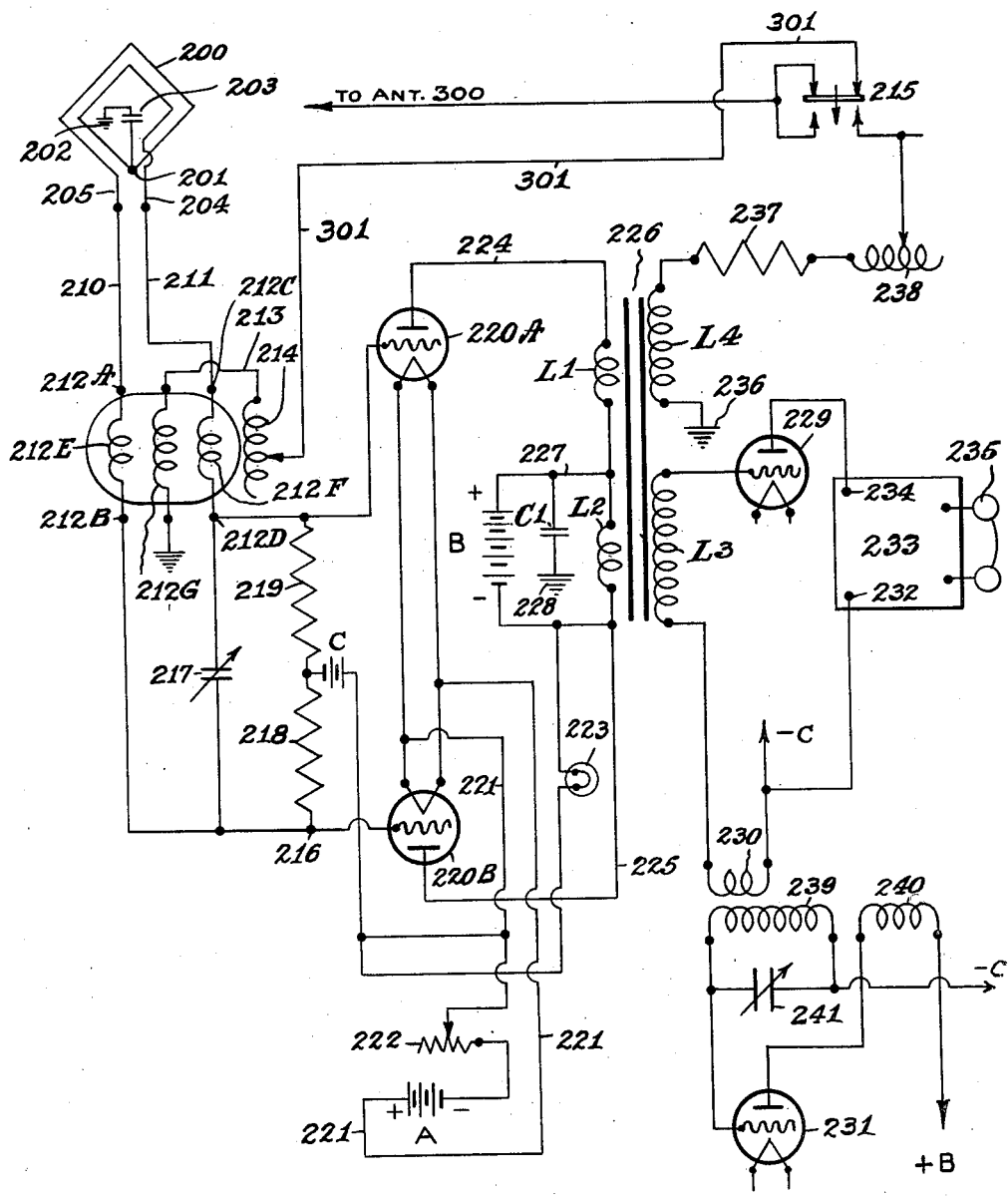

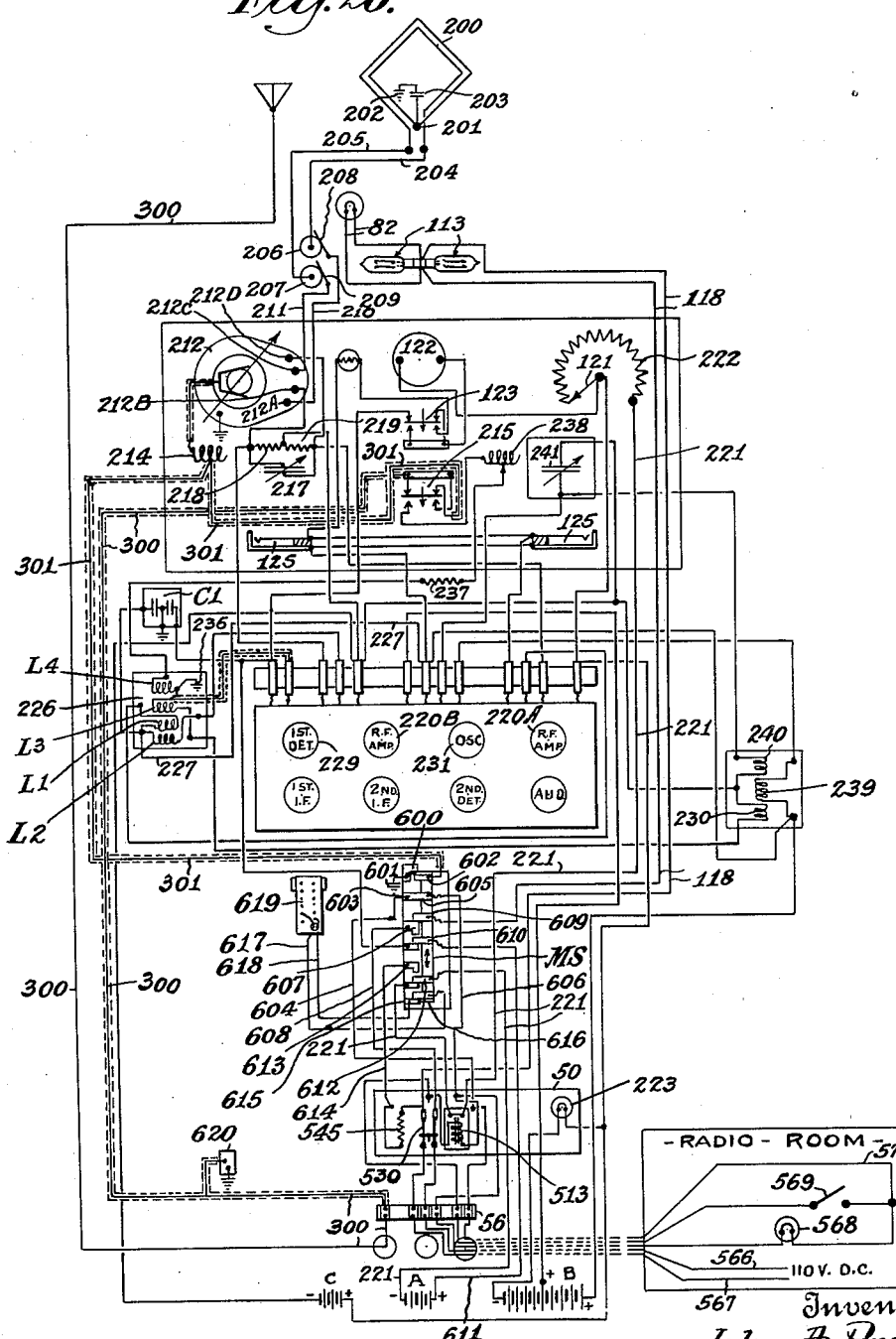

Patented Oct. 24, 1933

1,931,680

UNITED STATES PATENT OFFICE 1,931,680

RADIO DIRECTION FINDER

John A. Proctor, Lexington, Mass., assignor, by mesne assignments, to General Electric Company, a corporation of New York Application May 11, 1928. Serial No. 277,026

8 Claims. (Cl. 250—11)

This invention relates to radio direction finding systems, and more particularly to an improved apparatus therefor.

In radio direction finders, as well as in other marine installations controlled by electricity, space is at a premium and it is necessary to secure all parts in their cooperative relationship in a minimum of space without sacrificing mechanical or electrical efficiency. Hitherto, radio direction finders have comprised a plurality of separate units, such as a lead and a radio receiving set, which by being separate from each other, were not readily susceptible of unitary control, nor adapted to function with any degree of accuracy, owing to such inability to exercise uniform control of various parts.

The subject of radio direction finding is so relatively new that proper installations suited for the purpose of direction finding are not generally available, and such lack hinders to a considerable extent the proper and efficient installation of such systems on ships generally.

It is an object of this invention to provide an improved direction finding apparatus which is self contained and which is adapted to be housed in a unitary housing.

Yet another object is to provide such an improved apparatus which may readily be installed on ship board as a complete functioning unit.

Still another object is the provision of an improved design of the various parts of the apparatus of a radio direction finding system whereby they may all be encompassed in a minimum of space in a relatively small, unitary housing.

These and other important objects and advantages will be described in the specification and illustrated in the accompanying drawings, the preferred embodiment shown being given by way of illustration only, as it will be readily understood that the underlying principles of this invention may be incorporated in a variety of devices without being limited in their useful applications except as such limitations are clearly imposed by the appended claims.

For the purpose of illustration, there has been shown a preferred embodiment, the component parts of which are illustrated in the accompanying drawings in which like parts are designated by the same numerals throughout, and in which Fig. 1 is a side elevation of a radio direction finder, comprising a loop, loop pedestal, tripod, loop-rotating mechanism, indicator device, and a casing for housing the various instruments, batteries, etc., used in connection with the finder;

Fig. 4 is a central vertical section of the casing showing a Sperry repeating compass mounted under the top cover, all doors being shown in the closed position and batteries suitably mounted in the battery compartment;

Fig. 5 is a longitudinal section of one of the marine terminals;

Fig. 6 is a horizontal section on line 6—6 of Fig. 4, showing the switchboard and battery partition;

Fig. 12 is a detail vertical section taken on line 12—12 of Fig. 3, showing the panel lighting means and supporting means for the Sperry repeater mechanism;

Fig. 13 is a detail vertical section taken on line 13—13 of Fig. 3, showing the compensating means for the cover;

Fig. 14 is a vertical section taken on line 14—14 of Fig. 12, showing a detail of the panel lighting means;

Fig. 19 is a condensed wiring diagram showing the tube circuits; and

Fig. 20 is a complete wiring diagram of the direction finder circuits.

Figure 1:
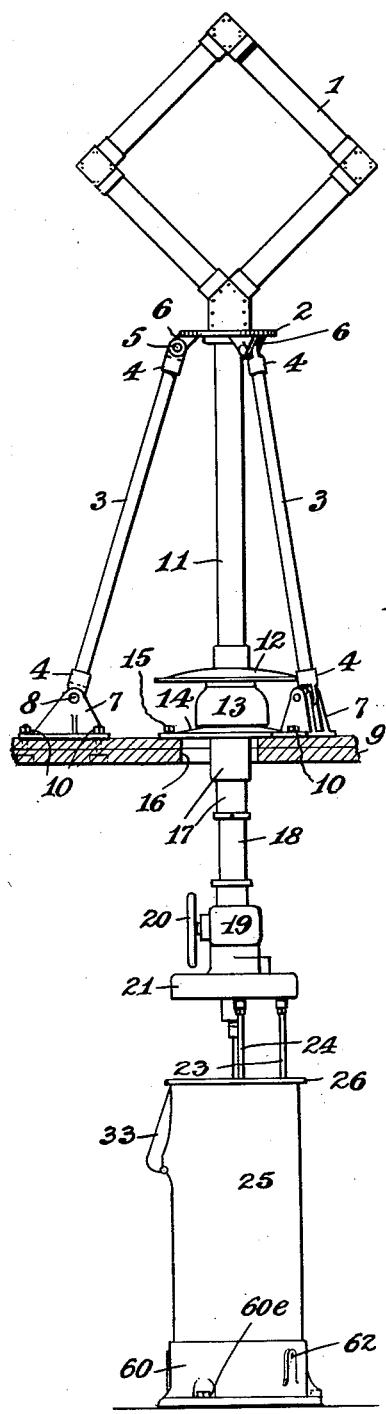

Referring now to Fig. 1, there is shown a complete radio direction finder comprising an enclosed loop aerial in rotatable casing 1, guided in a plate 2, which in turn is supported by the legs 3 of a tripod. The legs of the tripod are provided with caps 4 which are connected to the plate 2 by bolted connections 5 engaging lugs 6 depending from the plate. At the lower ends of the legs, the caps engage supporting members 7, being pivotally secured thereto by bolts 8. The supporting members 7 are fastened to the decking 9 of the pilot house or navigator's cabin by any suitable means, such as bolts and nuts, designated generally by the numeral 10.

The tripod members support the loop structure for rotatable movement in a suitable fashion, while permitting a desired degree of flexibility in the mounting thereof, which is essential in marine construction generally.

Depending from the loop casing 1, Fig. 1, and its guiding plate is the hollow pedestal 11 which serves as a weather-proof conduit for the leads from the loop in hollow metallic casing 1 which is in communication with hollow pedestal conduit 11. The conduit 11 is fixed at its lower end to a flexible coupling 12 and casing 13 adapted to cover the ball-bearings (not shown) upon which the loop structure and its pedestal conduit 11 is rotatably mounted. Member 14 is adapted to serve as a bearing plate for the rotatable elements above noted, and is secured to the decking by any suitable means, such as headed screws 15. This bearing member overlies an aperture 16 in the decking thru which passes the member 17, which is a continuation of member 14.

Telescoped into member 17, and in frictional engagement therewith, is another tubular member 18 which is fixedly connected to the controlling mechanism housing 19. This housing serves to contain the loop operating mechanism which is operated by the control member 20. The housing 19 is prolonged downwardly and outwardly to form a casing 21, adapted to contain the automatic compensating means for the direction finder. The above parts from tube 11 to the conduits below are formed with openings for the downward extension of the loop-leads.

Subjacent to the compensator housing and connected thereto are the conduits 22, 23, 24, Figs. 1, 3, 4, 16, which serve to conduct the leads from the loop to the radio receiver set 25, and which are secured to the cover 26 of the receiver casing.

Figure 3:
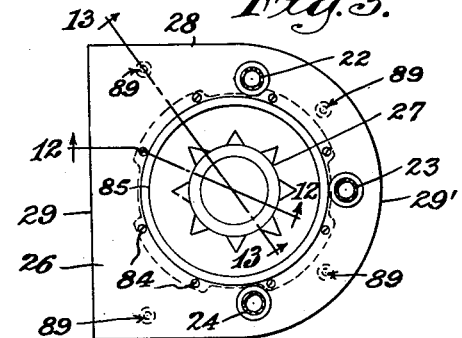
Fig. 3 is a top plan view of the top cover.

In the cover of the receiver casing is positioned a suitable indicator, Fig. 3, such as a dummy compass or a Sperry repeater designated generally by the numeral 27, Figs. 12, 13, 15, 16.

Figure 2:
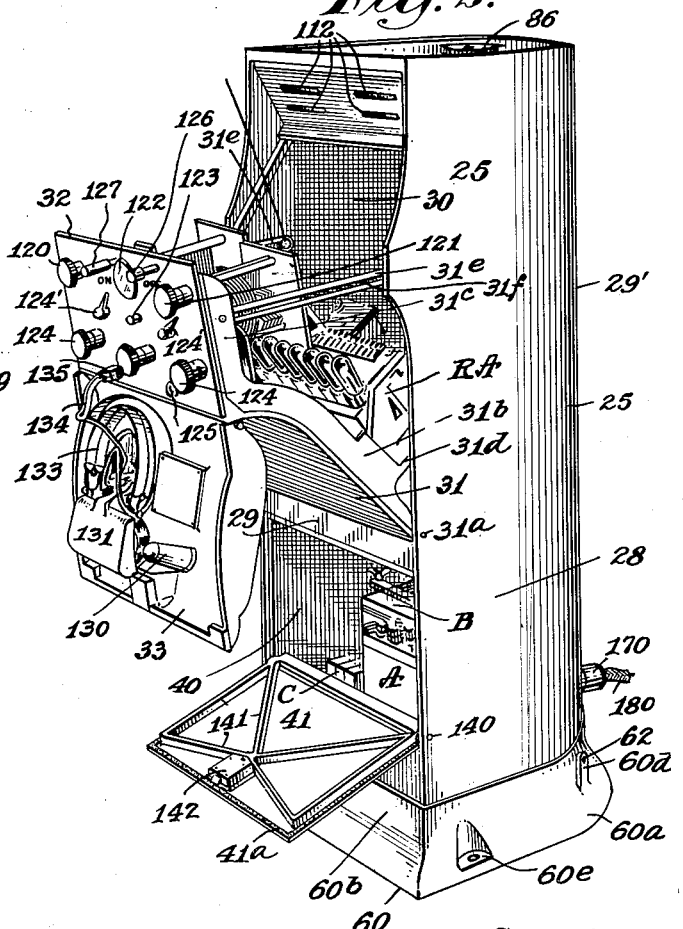
Fig. 2 is a perspective view of the casing or base receiver, with the top cover removed, the panel support door, the panel and telephone door, and the battery compartment door open.
Figure 11:
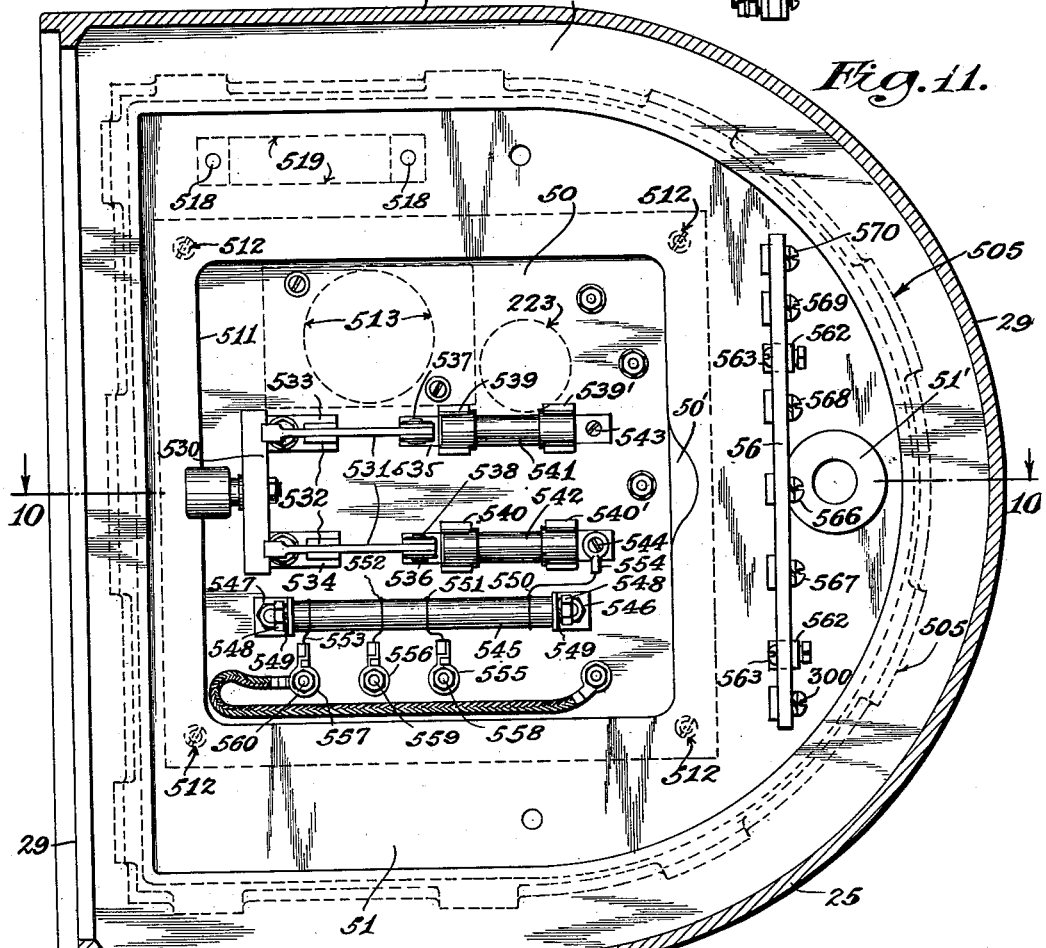
Fig. 11 is a bottom plan view of the parts shown in Fig. 10.
Figure 15:
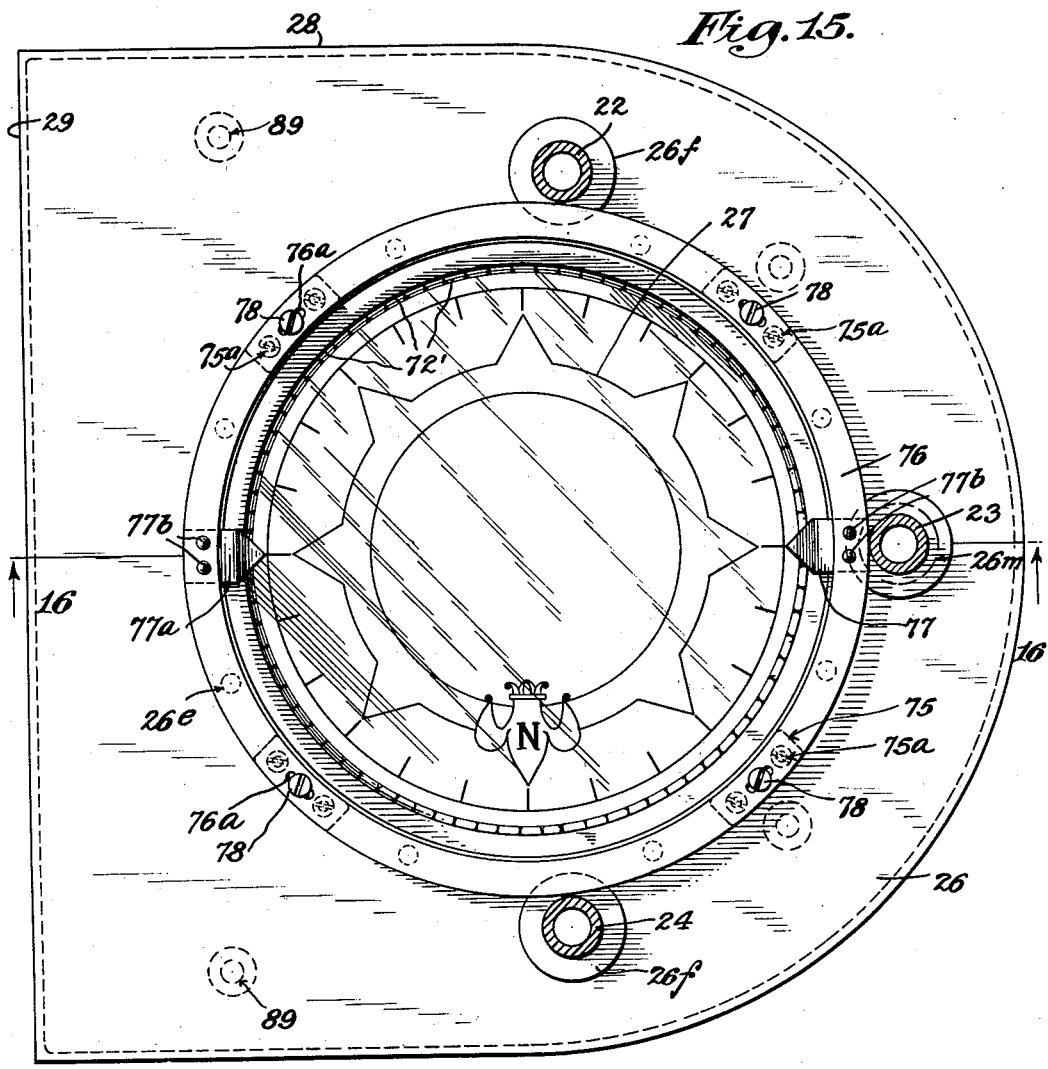
Fig. 15 is an enlarged top plan view of the cover showing a dummy compass and an index ring mounted thereon, the index ring serving for the adjustment of the pointer with respect to the keel line of the ship.

The receiver casing 25, Figs. 2, 3, 11, has substantially parallel side walls 28, a plane front portion 29, and a curvilinear rear portion 29', the whole presenting a combined semi-spherical and rectangular cross-section, the sides of the rectangle being formed by the side walls of the casing, and the semi-spherical portion being formed by the rear curvilinear portion 29', as shown particularly in Figs. 3, 6, 11 and 17.

The particular cross-section of the receiver casing is an important feature of novelty in the present invention, as the space defined by the walls is so configured as to provide ample space for the various operating parts and batteries, etc., while at the same time reducing to a minimum the amount of deck space or room necessary for its installation. A further decided advantage of the configuration noted, is the fact that an appreciable saving in metal is permitted by the novel design of the casing without affecting the necessary space for the operating parts and batteries, above noted. The novel features of design with the resulting economy of material and space will be referred to more in detail hereinafter in the discussion of the several parts of the device in their cooperative relationship.

The main casing 25, Fig. 2, comprises two main compartments, designated generally by the numerals 30 and 40 respectively. Compartment 30 houses the operating mechanism and is provided with a compartment door 31 which serves as the main support for the operating panel 32. The operating panel is normally covered by a door or panel 33.

The battery compartment is separated from the upper compartment 30 by a partition 50, Fig. 4, supported on a member 51, which in its turn is supported in a flange 52 of an annular projection 53, which is integral with the casing structure. A suitable sealing material, such as lead, may be brought into the flange portion 52 of member 53 in order to firmly secure member 51 to the support 53. Lead being resistant to corrosion, is particularly suited for use in the battery compartment and aids in preventing any fumes emanating from the A battery from reaching the compartment 30. At its rear portion, member 51 is provided with a tapped boss 51', which serves as an outlet for the Sperry repeater circuit leads. These wires are suitably insulated and the whole made water-tight to prevent any direct communication between the two compartments, as pointed out above.

This structure is shown more in detail in Figs. 6–11 inclusive, and is described herewith.

Figure 7:
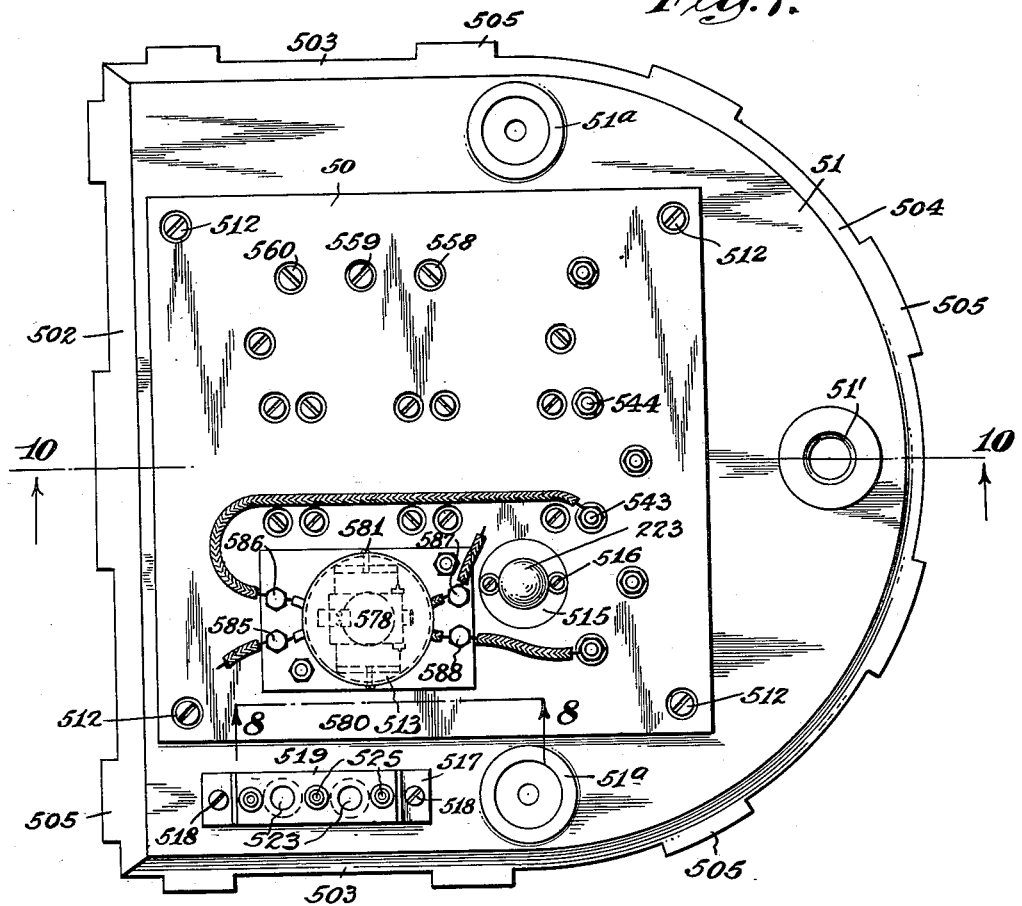
Fig. 7 is a top plan view of a metal partition and an associated instrument mounting panel separating the receiving section and the battery section of a radio direction finder.

Referring now to Fig. 7, there is shown a dished casing partition 51, having depending plane front and side portions 502 and 503 respectively, and the semi-circular rear portion 504, beveled as shown. At the lower portion of the periphery of this member, there are provided a plurality of anchoring lugs 505, adapted to fit into the channel 506 in a flange 52 of a radio direction finder casing 25, the whole being held in cooperative engagement by means of a lead seal 507, formed by pouring molten lead in the channel 506 around and about the portions 502, 503 and 504 in the channel 506 in the flange 52 of the radio direction finder casing 25. This construction not only permits a water and gas-tight joint between the respective compartments of the casing and prevents the access of battery fumes to the radio apparatus, but also insures a rigid engagement of the partition to the casing wall.

Member 51, Figs. 4, 6–11, is provided with a tapped boss 51', which serves as an outlet for the Sperry repeater circuit leads. These wires are suitably insulated and the whole made watertight to prevent any direct communication between the two compartments, as noted above. A corresponding pair of counter-board bosses 51A are provided on either side of member 51, as shown particularly in Fig. 7. These bosses are adapted to serve as conduits for the battery leads, which latter are sealed therein in any suitable manner as by means of pothead compound flowed into the cup formed by the rim of member 51A. These bosses are cast integral with member 51, before it will of course be understood, that they may be separately fashioned and secured to the plate by soldering or weltering as desired. The partition 50, of bakelite dielecto or any other suitable insulating material, is secured to cover a rectangular opening 511 in the member 51 by suitable securing means, such as a plurality of machine screws 512.

Suitable gasket material, 50', Figs. 4, 6–11, such as vellenoid, as noted above, may be interposed between the panel 50 and the supporting partition 51, for the purpose of preventing access of fumes to the radio compartment. Mounted on the top of the channel and therefore positioned within the radio compartment, is a radio-room relay designated generally by the numeral 513, which will be described more in detail hereinafter.

To the rear of this relay, Figs. 4, 6–11, there is positioned a protective lamp 223, mounted in a suitable socket 515, which is attached to the panel by screws 516. To one side of the channel and immediately adjacent the relay, there is placed a spare lamp holder 517, which is secured to the member 51 by means of suitable screws 518. This spare lamp holder (shown in detail in Fig. 9), may be of any suitable construction, and as shown, comprises a flat strip 519, bent at both ends to form right-angle supporting legs 520, which in turn are outwardly bent to form base members 521 which are apertured to receive the screws 518 adapted to hold it on to the panel.

Superposed on the upper portion of this member 519 is an insulating strip 522, Figs. 4, 6–11, tapped to provide socket portions 523 for the spare lamps 524. The bases of the lamps project thru clearance holes 523' in the metal. Insulating strip 522 is secured to the member 519 by suitable means, such as upset rivets 525, and interposed washers 526. The device described provides storage means for extra lamps, so that they are readily available for replacement purposes when the lamp 223 becomes burned out or otherwise put out of commission.

To prevent damage to the spare lamps, due to weather stresses and the like, the insulating member 522 is preferably made of a resilient material, such as rubber.

Underneath the partition 50, and therefore positioned within the upper portion of the battery compartment, is the double-pole, single-throw, knife-switch 530, which is normally in operative position, but is opened when the operator is working in the battery compartment, thereby cutting off the 110 volt D. C. current.

The switch is provided with the usual knife blades 531 engaging clips 532, mounted on terminals 533, 534, the blades being mounted for rotation in terminals 535, 536 and being held in position by rivets or bolts 537, 538. Abutting the members 535, 536 and in electrical and mechanical connection therewith, is the cartridge sockets 539, 540, adapted to receive the cartridge fuses 541, 542, the fuse mountings being designated at their ends by the numerals 539', 540'. These mountings are secured to the panel by screws 543, 544. To the left of the switch (immediately below it, as shown in Fig. 11), is shown the trickle charger 545, mounted in clips 546, 547 and held in position by means of nuts 548 and spring washers 549. The trickle charger, being used for direct current, is of the resistance type and is provided with a plurality of leads 550, 551, 552, and 553, adapted to give the desired voltage reduction. These leads are provided with the usual pig-tail connections, which are secured to clip members 554, 555, 556, 557, which in turn are secured to the panel by terminal screws 544, 558, 559 and 560.

At the rear of member 51, Figs. 4, 6–11, immediately in front of the tapped boss 51' and on the bottom side of the partition, is an incoming terminal board designated generally by the numeral 56. This board is made of bakelite or any other suitable insulating material, and is attached to the partition proper by a pair of brass strips 562 by means of screws 563. The members 562 are bent at right angles, as shown at 564 in abutting relation to the bottom of partition 51 and are secured thereto by bolts 565. On this terminal board are mounted terminal leads from the radio room and antenna 300. The radio room leads are designated as follows:—110 volts D. C.—No. 566; +110 volts D. C.—No. 567; radio room light—No. 568; radio room switch—No. 569; and common lead—570. These several leads are suitably connected to the members on the installation panel shown in Figs. 7–11, and their cooperative action will be described more in detail hereinafter.

A flanged door 41, Fig. 2, is provided in the front of the casing as a closure means for the battery compartment, and permits ready access thereto. This door is recessed in a suitable opening in the casing, the edges of the opening being covered with felt strips 41a to provide a splash-proof assembly.

The bottom of the main casing is adjustably fitted into a base casting 60 and secured thereto by suitable means, such as headed bolts 61 and locking member 62 (set screws).

The various operating parts of the device and the batteries are secured in their opening positions as follows:

The top cover 26, Figs. 4, 12, 13, 15, 16, is provided with a central opening into which fits the bowl 70 of a dummy compass or a Sperry repeater. The dummy compass comprises a compass card 27 provided with the usual markings. This card is mounted for manual rotation on a revolving member 71, which, as shown, may comprise a composite sheet of non-breakable translucent materials such as a sheet of paper or celluloid 71a having suitable compass markings thereon, interposed between two sheets of glass 71b and 71c. The translucent compass card is held in operative engagement with the revolvable supporting ring 72 by means of a flat circular clamping ring 73, which is held in its operative position by suitable means, such as machinist's screws 74 tapped into member 72. The member 72 is substantially of inverted L-shape in cross-section, having an overlying portion 72a which cooperates with the clamping member 73 to define the clamping means for the compass card.

The portion 72a is provided at its inner periphery with a plurality of recesses 72' which are adapted to serve as finger recesses for the manual operation of the compass card.

The cover 26 is provided on its under surface immediately adjacent the central aperture with an integral bossed portion 26a (Fig. 16), which defines with the cover a bearing surface 26b adapted to receive member 72. The compass card mounting is held in position against bearing surface 26b by means of a clamping ring 26c recessed at 26d to engage the card mounting, the clamping ring being secured to member 26a by any suitable means, such as a plurality of flat headed machine screws 26e.

As above noted, the compass card mounting is adapted to be manually revolved in the bearing channel defined by the channelled portions of member 26a and clamping ring 26c.

Suitably spaced around the compass are a plurality of spaced supporting members 75, secured to cover 26 by any suitable means, such as screws 75a. Members 75 are adapted to support member 76 which carries the fixed indicators 77, 77a, normally aligned to bear on the keel line of the ship, or the magnetic or the true meridian of a shore station. The indicators are secured to the member 76 by any suitable means such as rivets 77b.

To permit variation of the fixed indicators to conform to true directions as calibrated for the several instruments when installed, the supporting member 76 is provided with a plurality of slots 76a which are adapted to permit movement of the member 76 for a limited distance in an arc on either side of adjusting screws 78 which engage spacing members 75. It will readily be seen that by loosening the adjusting screws, the fixed indicators may quickly and properly be set for their true alignment, and so held by the simple expedient of tightening up the screws.

Referring now to Fig. 4, it will be noted that the compass card is adapted to be illuminated by a suitable source of light, such as an incandescent lamp 80 bushed in an aperture 70a of bowl 70, whose socket is held in operative relation thereto by means of lock nuts 81. Suitable current leads 82 are provided for the lamp and are connected to a source of current thru the operating panel lighting means 113, by the common current leads 118, all three lights being controlled by a single switch which is a component part of the master switch to be described more in detail hereinafter.

The bowl 70 may be secured in position by means of clamping members 83 secured to the cover by a plurality of screws 84. These clamping members are adapted to engage bezel member 85, which serves to retain the compass card 27 in position.

The cover 26 is suspended from the loop control housing and the compensator mechanism by means of members 23 and 24 previously referred to, Fig. 1. This construction makes the cover integral with the superstructure of the direction mechanism and avoids any weaving stresses due to differences in movement between the floor and the ceiling of the cabin or space in which it is mounted, which would occur if the above mentioned superstructure were originally connected through the cover to the casing 25 containing the electrical apparatus of the radio set.

The cover 26 is spaced from the casing 25 in any suitable manner, the following method having been found to be desirable. As shown particularly in Figs. 12 and 13, the casing is provided with a plurality of projecting shelf members 86 drilled, as at 87, to receive insulating bushings 88. These bushings are made of rubber and serve as supports for screws 89 engaging tapped bosses 90 in cover 26. It will now be seen that the cover 26 is resiliently guided in and both spaced and shock insulated from the casing by the rubber bushings referred to. This novel feature serves to prevent the transmission of vibratory motion due to the weaving of the deck to the compass or repeater structure, and to the illuminating means therefor, thereby ensuring long life to the relatively fragile parts of the device.

Figure 16:
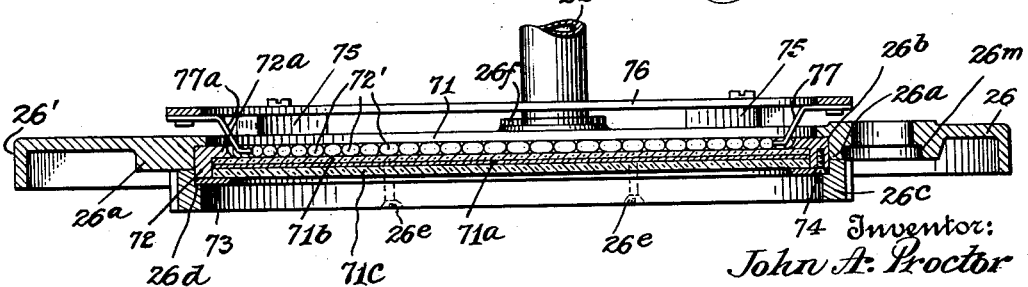
Fig. 16 is a vertical section taken on line 16—16 of Fig. 15.

As noted hereinbefore, the loop leads are introduced into the casing through any of the conduits 22, 23, 24, Figs. 2, 4, 16. These conduits are introduced into the cover and held therein by means of washers 26f, eccentric bushings 26g, washers 26h and lock nuts 26k.

Referring to Fig. 4, it will be seen that the conduits are provided with shouldered portions fitting inside of washers 26f. The reduced portions of the conduits, designated generally as 22′, 23′ 24′ are fitted with adjustable bushings 26g which are held in abutting relation with suitable recesses 26m in the cover by means of washers 26h and lock nuts 26k. This construction insures a rigid connection of the conduits to the cover and permits of easy installation and removal of the several units, together with adjustment of cover 26 with respect to the case 25.

The cover 26 is provided further with a depending flanged portion 26′ adapted to cooperate with the top of the casing to keep the cover properly aligned and prevent dust from settling into the interior of the casing.

The casing is provided at its upper front portion with an integral slotted member 110. This member is inclined inwardly, as shown in Fig. 12, and at its lower portion is bent forwardly at 111 to form a support for the operating panel 32. The slots 112 are vertically positioned in the member 110 and preferably extend horizontally thereof. While six of these apertures have been shown, it will be readily understood that any suitable number and configuration may be used. These apertures are so arranged as to throw the light from a plurality of incandescent lamps 113 downwardly on to the operating panel. The lamps, which may be of any suitable number and size are mounted in sockets 114 secured to angularly disposed wing portions 115 of a mounting member 116, by lock nuts 117. Current leads 118 connect the lamps to a suitable source of current, as referred to above.

The mounting member 116 is secured to member 110 at the rear of the forwardly bent portion 111 by any suitable means such as screws 119, which it will be observed are placed in an accessible position adjacent the edge of flange 111. It will be noted, that by the construction just shown, the lighting unit for the operating panel 27 may be removed as an entity, without trouble, and is susceptible of being easily installed and serviced, the necessary fitting and repair operations being adapted to be carried out on the separate unit wholly outside of its position when in operation.

Subjacent to the member 110 and abutting thereagainst at 111 at its upper portion is the supporting panel 32 Figs. 2 and 4. This member may be made of any suitable metal (preferably of low corrodibility), such as duralumin, and is adapted to mount the various operating controls of the direction finder thereon. This unity of control is further rendered possible by the novel assembly of parts wherein everything required for the operation of the set is immediately in front of the operator and directly underneath the loop control mechanism of the direction finder, so that no change in his position is ever necessary, all readings of the various instruments being taken from a position directly in front of the instrument.

The tuning controls on the operating panel, as shown in Fig. 2, comprises a volume control or balancer 120, a filament rheostat control 121, a filament volt-meter 122, the volt-meter control 123, and station selector controls 124 with their associated indicating pointers 124′. There is also provided a plurality of telephone sockets 125 and master switching controls 126, 127.

The cover 33 is provided with a member 130, whose function is to move the master switch control 126 when the cover is closed, thereby shutting off the various current controls, placing the A battery on trickle charge, and grounding the antenna. To the left of this member 130 there is provided a snap-cover 131 adapted to receive the head-phones of a telephone set. This telephone set is provided with head-bands 133, lead wire 134 and a telephone jack 135 adapted to engage the telephone sockets 125. By this construction all the operating parts are conveniently assembled and ready for use at any time and the electrical operation of the set is provided for only when the navigator opens the cover and depresses switch control 127, which places the radio direction finder ready for operation.

The various operating parts, such as the condensers, filament rheostats, master switching mechanism and panel assembly are described more in detail in copending applications, as the novel features are adapted for use in devices other than the one herein shown.

At the bottom of the casing, the battery compartment is provided with a member 41 of any suitable construction, adapted to provide a closure for the said compartment. This door is mounted for rotation on a rod 140, passing thru the sides of the casing structure, and it is further provided with stiffening ribs 141 and a lock 142.

Interiorly of the compartment are placed the batteries, described generally by the letters "A", "B", and "C". The batteries are supported upon a platform 145, mounted on suitable cross-supports 146, which supports raise the structure from the floor of the casing, as shown particularly in Figs. 4 and 18. This platform is conformed to the shape of the casing and serves as a mounting base for the several batteries. B batteries, of any desired make, abut against a plurality of stops 147, positioned at the bottom and sides of the platform, and are frictionally held with relation to the platform by means of a yoke 148, the yoke compressing the cross member as shown, and a plurality of threaded elongated bolts 149 passing up thru the platform on either side of the B battery assembly, thence thru suitable apertures in the yoke. Wing nuts 150 are screwed up on the members 149 and hold the yoke 148 on top of the B batteries, thereby preventing them from being moved from their position. If desired, washers 151 may be interposed between the clamping ends 150 and the yoke 148.

Figure 17:
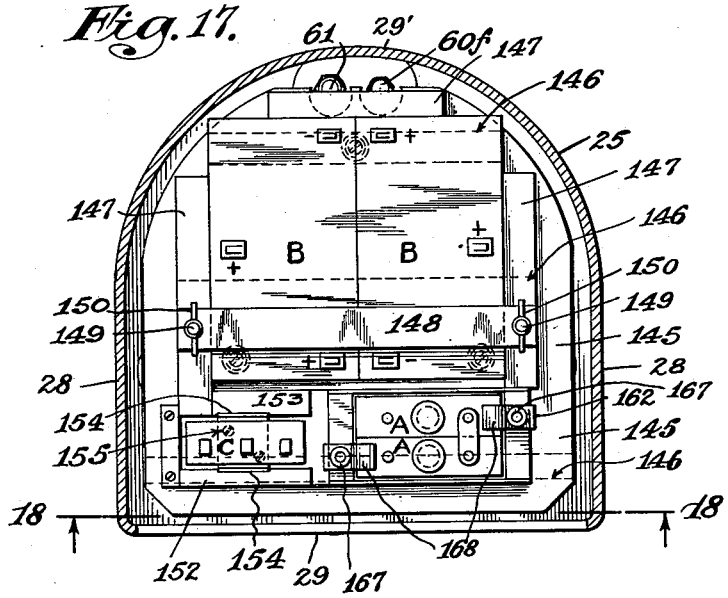
Fig. 17 is a horizontal section taken on line 17—17 of Fig. 4, and shows the battery compartment and means for mounting and securing the batteries.
Figure 18:
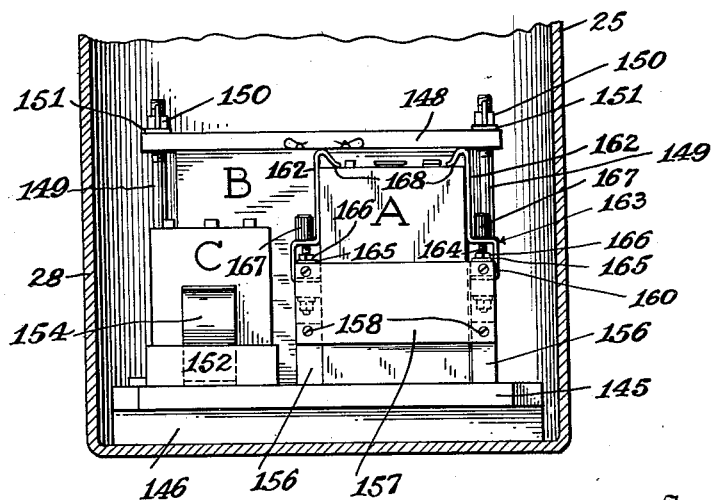
Fig. 18 is a vertical section taken on line 18—18 of Fig. 17, showing clamping means for the various batteries.

Forwardly of the B batteries (as seen in Figs. 17 and 18, to the immediate left foreground) is found the C battery. This is held in position by a device which comprises a pair of oppositely positioned cleats 152, 153, supported in any suitable manner on the top of the base. Intermediate of these cleats there is provided a cleat clip 154, which is secured to the base by any suitable means, such as a plurality of screws 155. The clip is suitably conformed and bent over so as to act as a spring clip for the C battery, when the latter is inserted between the prongs thereof. This clip may be made of any suitable material, such as phosphor-bronze or brass, having the desired characteristics of resiliency, low corrodibility and strength.

To the right of the C battery is placed an A battery. This is held in position between the pair of cleats 156 which extend upwardly over a substantial portion of the height of the battery. On either side of the battery there are provided retaining members 157, which are secured to members 156 by screws 158, these retaining members forming with the cleats a socket on which the A battery is adapted to be set.

Mediately of the members 156 and seated therein are a pair of lateral supports 160. Members 160 are adapted to support the clamping means for the A battery. These clamps 162 are provided with lateral portions abutting members 160 and are bent upwardly and inwardly to form the right angle portion 163. At the top of portion 163, the members are perforated to receive threaded members 164, which are locked in position with respect to members 156 and 160 by means of washers 165 and lock nuts 166. Knurled nuts 167 engage members 164 and serve to retract the upwardly extending portions 162 of the clamping members into cooperative engagement with the top of the A battery, the clamping members being provided with inwardly extending gripping portions 168.

It will thus be seen that the battery assembly is firmly held in position by a novel arrangement of clamping members which are easily removed, thereby permitting ready access to the several members of the assembly for servicing.

In this compartment there is also provided a trickle charger of any suitable type, such as a variable resistance 169, for the purpose of maintaining the A battery at full charge when it is not in use. The trickle charger is connected to the wiring in such a manner that when the cover of the operating panel is closed and the master switching mechanism actuated to disconnect the filament and plate currents, the trickle charger is connected to the 110 volt D. C. supply line and it is not disconnected therefrom until the navigator again opens the cover and presses the master switch control button 127. This assures a completely operative assembly at all times and will not permit the apparatus to be rendered inoperative by reason of the carelessness of the navigator in not disconnecting the A battery from the radio set and placing it on charge at the proper time.

While appropriate batteries for supplying the requisite filament, plates and grid-biasing currents have been shown, it will of course be understood that suitable battery eliminators may be substituted therefor without departing from the spirit and scope of the present invention.

These battery eliminators are well known per se, and are not shown herein as their installation and use is well known to those skilled in the art.

The several wiring systems are introduced into the battery compartment thru a plurality of special bushings, designated by the numeral 170 and adapted to be screwed into tapped bosses 171, 172, 173, at the back of the battery compartment (Fig. 6). These members are so constructed as to provide a means for bringing in the wires thru the sides of the casing and keep it water-proof.

Referring now particularly to Fig. 5, there is shown a main brass bushing 174, provided with an externally threaded extension 175, adapted to be screwed into the bosses above referred to. The bushing is threaded internally, as at 176, to receive the threaded brass sleeve nut 177. This nut abuts the brass washer 178, which in turn impinges on a rubber bushing 179 and forces it into cooperative engagement with the internally conical walls 174' of the main bushing 174. It will be noted also that brass washer 178 is so formed as to provide a conical bearing surface 178', which is adapted to co-act with the extending face 174' of the main bushing to force the rubber of the compressible bushing 179 inwardly into intimate contact with the wire or cable disposed therein, as shown at 180, seen at the lower right hand portion of Fig. 2.

Referring now to Figs. 4 and 6, it will be noted that the base casting 60 comprises an annular structure with an outwardly extending flange portion 60a and an inwardly extending support portion or pads 60c. The apron portion 60b is provided with bosses 60d, which are internally threaded to receive the locking screws 62, previously noted. The flange portion 60a is recessed at 60e and drilled to receive suitable bolts or lag screws, which secures the base casting 60 to the deck.

The pad portions 60c of the base casting are adapted to provide a plurality of screw sockets for cap screws 61. These members are adapted to pass thru the bottom of the casting 25 and secure it to the pads 60c, above noted. Cap screws 60f are tapped through the bottom of the casting 25 and are adapted to impinge on the pads 60c so as to raise or lower the casting 25. The clearance holes in the bottom of the casting 25 through which the screws 61 pass allow for lateral adjustment of the casting 25 as by the screws 62. It will now be seen that by the provision of the securing members 61, 62 and 60f, the casing 25 may be moved to properly align the upper portion having the compass structure, with the keel line of the ship or the magnetic or true meridian of a land station. This adjustable feature of the device permits the desired degree of accuracy in the calibration of any given installation and also permits the use of a standard apparatus under varying conditions, whereby it is merely necessary to adjust the device in any desired position by the adjusting members described.

The radio apparatus proper is adapted to be supported and mounted for operation on the back of member 31 in a manner now to be described, so as to have all operating parts readily accessible from the front of the casing.

The door panel 31 above referred to is mounted for rotation on a spindle 31a, which projects thru the sides of the casing as shown in Fig. 2. The spindle is held in position by any suitable means, such as set screws (not shown).

The rear portion of the door panel 31 is so configured as to provide supporting flanges 31b, extending upwardly and inwardly to form shelf portions 31c, which are adapted to support the operating panel assembly. The flanges 31b are cast integrally with the door structure, altho it will be readily understood that they may be formed separately and attached thereto by any suitable securing means, such as machine screws.

The shelf supports 31d extend inwardly from the flange portions 31b and are adapted to support the radio control apparatus, designated generally by the symbols RA. The door 31 is limited in its forward movement by members 31e, provided with slots 31f extending substantially the entire length of the members 31e. These slotted members are movably attached to the upper portions 31c of the door structure by means of rivets 31g, and are restrained in their forward movement by abutment against the stud members 25m, secured to the side walls of the casing.

It will now be seen that when it is desired to inspect the interior of the casing compartment 30, Fig. 2, the panel 31 may be tilted or swung outwardly and will be held in position by the members 31e, cooperating with studs 25m.

At the rear of the plane portion of the door panel, there are provided a plurality of bosses 31h, Fig. 4, upon which is mounted a master switch panel 31k. The master switch mechanism, designated generally by the symbols MS, is mounted on the panel 31k, and is actuated by the connecting rod CR, attached to the link mechanism LM, secured to the back of operating panel 32, as indicated in dot and dash lines in Fig. 4, and actuated by control members 126 and 127, the former of which in turn is adapted to be actuated by knob 130, positioned on the interior of member 33. When the door 33 is closed, the member 130 depresses the control knob 126, thereby actuating the switch mechanism thru the rod CM, and cutting out the filament and plate circuits together with the 110 volt D. C. lighting circuit for the operating panel and the Sperry repeater or the dummy compass, and puts the A battery on trickle charge, as well as grounding the antenna.

This switching mechanism is described in full detail in application filed May 11, 1928, Serial No. 277,027.

For the purpose of simplifying the reading of the circuits, the controls of the master switching mechanism MS will be described here, Fig. 20.

At the top of this device MS, Fig. 20, a contact member 600 is grounded at 601 through any suitable lead. The movable contact member 602 engages 600 when the master switch is in the "off" position, thereby grounding the antenna through the lead 301. Contact 603 is connected to the relay 513 through lead 604, and in the "on" position engages clipping contact 605, which connects through lead 606 to the relay and also to the radio room signal light 568. Member 607 is provided with double contacts and is connected to the main switch 530 by lead 608. In the "on" position contact is made with clip contact 609 to lead 118, which acts as current supply for the instrument panel lights and the dummy compass or Sperry repeater light. The return lead of 118 connects directly to the other side of main switch 530. In the "off" position, contact member 610 engages contacts 607, thereby closing the 110 volt D. C. circuit to the positive side of the A battery through lead 611. Connection to the negative side of the A battery is made through lead 130, 221, movable contact 612, and fixed contact 613, lead 614 to the trickle charger 545 and main switch 530. The Sperry repeater circuit is closed in the "on" position through contacts 615 and 616 by leads 617 and 618, which are suitably connected to the Sperry junction box 619.

It will be seen that a single movement suffices to place the various current supplies in circuit, and to warn the radio operator that the radio direction finder is to be used, as well as to unground the antenna and to take the A battery off trickle charge.

Referring now to Figs. 19 and 20, there is shown schematic diagrams of the radio frequency portion of the electrical system of the improved direction finder, together with the current supply and control circuits comprehended in this invention. The circuit comprises essentially a receiving member which, as shown, may be a loop, designated generally by the numeral 200. This loop is symmetrically wound and is tapped at midpoint 201 to provide a lead to ground 202 through a fixed capacity 203. The loop leads 204—205 are electrically connected to suitable collector rings 206—207. Suitable brushes 208—209 are associated with the collector rings and are in turn connected thru suitable leads 210—11 to contacts 212A and 212C of the balancer 212. The other terminals of member 212 are designated generally by numerals 212B and 212D.

Interposed between terminals 212A, 212B, 212C and 212D are stator windings 212E and 212F (Fig. 19). These windings are symmetrically wound and astatically connected in the loop circuit. Inductively coupled to the stator windings are a pair of rotor windings indicated at 212G which are grounded to the casing 212 and supplied with a current lead 213, which in turn is connected to a variable inductance 214. The variable inductance in its turn is connected to the antenna 300 thru shielded antenna lead 301 by a sense switch 215, which is normally in the "off" position, thereby disconnecting the antenna from the sense circuit.

A lighting arrester 620 is suitably positioned in the antenna circuit and comprises a standard neon gas lighting arrester. Should a surge of lighting or any other high voltage, such as induction from the radio transmitter, accumulate on the antenna this charge would be carried to ground by means of this lighting arrester, thus protecting the internal wiring and preventing any possible damage to the direction finder apparatus.

Terminals 212B and 212D are provided with suitable wiring and are connected in shunt at 216 by a variable tuning condenser 217. From terminal 216 a lead extends to one side of a pair of grid biasing resistances 218 and 219, the other side of these resistances being connected through a suitable lead to terminals 212D. The lateral leads to the sides of the grid biasing resistances are severally connected to the grids of a pair of vacuum tube amplifiers 220A and 220B. At the mid-point of the biasing resistances connection is made to the proper biasing potential designated generally by the letter C.

The vacuum tubes above described are provided with a common filament supply 221 which is connected to a filament voltage supply A through a variable resistance 222. The positive side of the bias battery C is connected to the negative terminal of the filament. It is also connected to the negative terminal of the plate supply B through protective device 223 (Fig. 19). This protective device is preferably a 3½ volt lamp of the type generally used in flash-lights.

The plates of the vacuum tubes are connected through suitable leads 224 and 225 to the primary windings L1 and L2 of a radio frequency coupling transformer designated generally by the numeral 226. These windings are connected in series, and at the electrical mid-point of the group, a lead 227 is connected to the positive side of the plate supply B. Interposed between the mid-point terminal and the plate supply is a radio frequency by-pass condenser C1, which in turn is grounded to the casing at any suitable point 228.

A separate by-pass condenser of about 2 mfd. capacity is provided for both the B battery and the A battery, each condenser being placed in a separate container, or both may be encased in a common container as shown at C1, Fig. 20.

Magnetically coupled to the primary windings L1, L2 is the secondary winding L3. One end of this winding is suitably connected to the grid of a frequency converter tube 229; the other end of the secondary winding L3 being suitably connected to one end of the coupling winding 230 of a radio frequency oscillator designated generally by the numeral 231. The other end of the coupling winding 230 is connected to the proper biasing potential designated as C and also to one terminal 232 of the intermediate frequency amplifier designated generally as 233. The plate of the frequency converter or first detector tube is connected to the other terminal 234 of the intermediate frequency amplifier detector and audio frequency amplifying system, which, as above noted, has been designated by the numeral 233.

Suitable sound reproducing devices 235 are provided in the output circuit of the audio amplifier system, this latter system being generally known, but shown here merely in diagrammatic form in order to show its relation to the radio direction finder system comprising the present invention.

The secondary winding L4 of the radio frequency coupling transformer is grounded at 236, and is connected to the sense switch through resistance 237 and variable inductance 238. When the sense switch is depressed from its normal position, the antenna is connected to the primary winding L4 through the resistance and inductance as shown and described.

The coupling winding 230 of the external heterodyne oscillator circuit is magnetically coupled to windings 239 and 240. The primary winding 240 of the oscillator circuit is connected to the plate terminal of a vacuum tube oscillator; the other end being suitably connected to the positive end of the plate current supply. The secondary winding 239 is connected at one end to the negative grid bias and across its terminals is interposed a variable tuning condenser 241. The other end of the secondary winding is connected in the usual manner to the grid of the oscillator tube as above mentioned.

While a particular oscillation circuit involving a magnetically coupled resonant circuit associated with an oscillator tube has been described, it will, of course, be understood that any other suitable means of generating or imposing oscillations may be used without departing from the spirit and scope of the present invention.

The combination of the loop and balancer with a push-pull radio frequency amplifier results in an exceptionally well defined null point, indicating the substantially correct bearing of the received signal. The adaptation of a push-pull circuit to a radio frequency amplifying system produces novel results in that it maintains the symmetry of the loop antenna circuit, thereby enhancing its direction finding value. The null points obtained with this system in use are characterized by their sharp definition, the average variation rarely exceeding the range of from one to three degrees, the latter value being readily obtained with relatively careful adjustments of the controls.

The compensation for the electrical variations produced in the loop field by the magnetic waves set up as a result of the reception of carrier waves by the metallic components of the ship's rigging, the stacks and hull, is accomplished by the device known as the balancer, which is interposed in the loop circuit. This device, as previously noted, comprises a pair of fixed or stator windings connected between the loop terminals and the grids of the radio frequency amplifying tubes. A tuning condenser is shunted across the grid leads in the usual manner as are a pair of resistances which are connected at their midpoint to the negative grid bias. Magnetically coupled to these stator windings is a pair of rotor coils, which are connected between antenna and ground.

It will be appreciated that the undesired currents set up in the loop by the magnetic currents induced in the ship's parts may be effectively cancelled by setting up an opposing current in the balancer device by suitably rotating the rotors to place these coils in a position to induce an opposing current in the stator windings.

In order to prevent a ship's navigator from using the radio compass when the ship's radio transmitter is working, a relay 513 is placed in the direction finder circuit, Fig. 20. The primary object of this device is to prevent the radio operator from operating his transmitter when the direction finder is in use by the navigating officer, as by doing so the direction finder would be damaged. The red light 568, Fig. 20, above referred to at the operator's transmitter is in the circuit and is lighted only when the push button switch on the direction finder is in the "on" position. This indicates to the radio operator that the officer wishes to use the direction finder and the operator therefore opens his antenna switch, the contacts at the same time closing the relay circuit, thus putting the current on the filament of the direction finder and putting the direction finder in operation.

When the officer has finished with the direction finder and has put the push button switch in the "off" position, the signal light in the radio room thereby is cut out, thus signalling to the radio operator that the officer has finished using the direction finder and that the operator is free to transmit or receive by means of the regular ship's radio apparatus.

Figure 8:
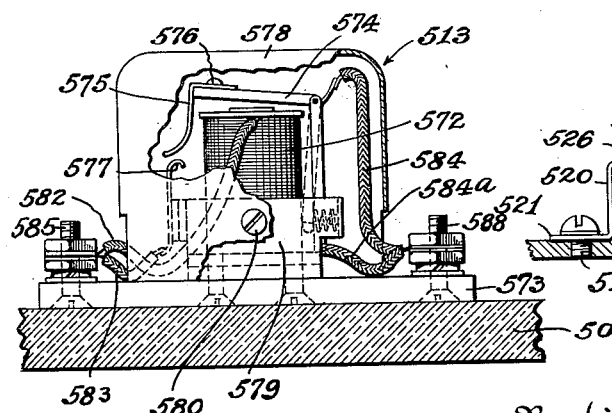
Fig. 8 is a detail section taken on the line 8—8 of Fig. 7, showing an elevation partly in section of a relay mounted on the panel, the panel being shown in section.
Figure 9:
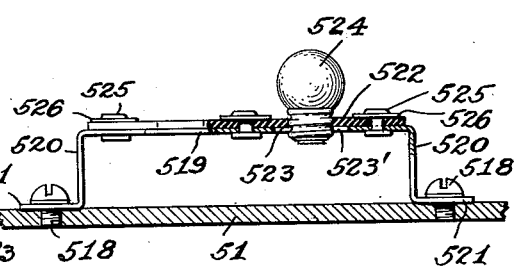
Fig. 9 is a side elevation, partly in section, of a protective lamp holder mounted on a metal partition and to one side of the panel.
Figure 10:
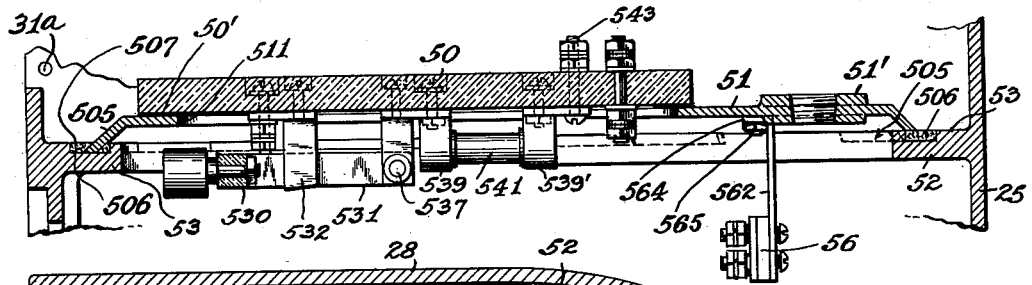
Fig. 10 is a vertical section on line 10—10 of Figs. 7 and 11.

The relay 513 consists in detail, Fig. 8, of a low resistance coil 572, which is mounted for operation on the insulating base 573. The armature 574 is substantially L-shaped, and is provided at one end of the horizontal upper arm with an angular clip member 575 fastened to the armature by a suitable screw or bolt 576. This member 575 is curved outwardly at its lower portion to provide sliding contact with terminal 577.

The cover 578 is held in place by a U-shaped clip 579, and is fastened by a pair of screws 580, 581. Suitable flexible leads 582, 583, 584, 584a are provided from the terminals 585, 586, 587 and 588 for making appropriate connections inside of the receiver. These electrical connections will be referred to more in detail in a later discussion of the circuits of the direction finder.

Referring now to Fig. 20, there is shown at the bottom portion thereof a control for the various circuits. The main line switch 530 is shown in the "on" position and the master switch (MS) also shown in the "on" position, that is, with the apparatus available for use by the captain or navigator for determining his position or bearing.

Considering the master switch MS, it is noted that in this position the uppermost contact member which is connected to the ground, is disconnected in the "on" position. This contact member closes the circuit between the antenna and ground when the switch is in the "off" position.

When the master switch is in the "on" position, the radio room light circuit is closed, thereby signalling to the radio operator that his apparatus is to be disconnected. This circuit is connected thru the relay and the terminal board directly to the radio room by the switch immediately below the antenna grounding switch members.

The double switch member controlling the compass bowl and operating panel lights, shown in the "on" position, permits the direct flow of the 110 volt D. C. current thru the proper circuit to these lights.

When the master switch MS, Fig. 20 is moved to the "off" position, the 110 volt D. C. line is connected thru the double-clip switch member above referred to to the positive pole of the A battery and the switch members immediately below are connected to the negative side of the filament battery thru the trickle charger 169, and the main line switch.

In the "on" position, this trickle charger control switch is connected directly to the armature of the relay, the combined action of the switch and the relay permitting the closing of the filament control resistance.

The bottom switch member is disconnected from the radio direction finder proper and serves solely for connecting the Sperry repeater compass (not shown), to the master compass, the appropriate connection being indicated by reference to the conventional Sperry junction box 619.

In the operation of the direction finder, Fig. 2, the cover 33 of the receiving panel 32 is unlocked and drawn open. The navigator then presses the button 127, which is the "on" button for lighting the filaments. This button is connected to the master switch MS, Fig. 4, which lights the filaments, and automatically disconnects the A battery from the trickle charge.

As is noted previously when the cover 33 is shut the master switch control button is operated, thereby to cut out the filament circuit and place the A battery on trickle charge. The filament voltage is adjusted to the desired value by means of the control member 121, the correct value being read on the meter 122.

The sense switch on shipboard is placed on line after the loop is turned for a "maxima" in the approximate direction of the radio beacon station ashore.

The station selectors 124, Fig. 2, are then operated until the desired station is heard in a properly set up and calibrated instrument; any given station will have a constant dial reading. The desired volume of signal is obtained by adjusting the control knob 120. When the desired station signal has been received the loop is rotated until the signal diminishes to a minimum or "null" point. The ease of securing "null" point is dependent to a considerable degree upon the experience and amount of practice had by the operator. The "null" point is often difficult to obtain owing to strong signals. Under such conditions the control 120, which may be a suitable resistance or a compensating condenser, or a balancer, is adjusted for a weaker signal.

Where a compensating condenser, or a balancer, as described in the above, is used in a device of the kind described herein, an extremely fine "null" point can be obtained.

When the "null" point has been found to be sufficiently sharp in its characteristics, the degree reading of the gyro compass or Sperry repeater is taken or the reading on the dummy compass, if the latter is used. Where a gyro compass is used, it will, of course, be understood that it is calibrated with respect to the master gyro compass, so that its bearings may be regarded as true bearings.

Where a dummy compass is used, it is first set at zero and the degree readings of the signal are corrected or converted into true readings by one of the watch officers.

What is claimed is:

1. A radio direction finder which includes a rotatable loop aerial and casing therefor; radio receiving apparatus, an enclosing casing for said radio receiving apparatus and located underneath said loop casing; loop-leads extending down from the loop in its casing to said receiver casing and the radio receiving apparatus therein; a rotatable tube supporting said loop-casing and encasing said leads; a rotatable compass card concentric with said rotatable tube; a control-panel with leads for said radio receiving apparatus and forming a portion of said receiver casing; operating means for rotating said loop-casing supporting-tube, said operating means being located above said receiver casing and accessible to the operator in a position for manipulating the controls on said panel and rotating said concentric rotatable compass card; and a loop compensator housing arranged concentrically with said rotatable compass card and rotatable loop-casing lead-encasing supporting tube and located between said tube-operating means and receiver casing; the members between said tube and the radio receiving apparatus in said casing being formed with openings for the passage of the loop leads.

2. A radio direction finder which includes a rotatable loop aerial; radio receiving apparatus cooperating therewith; a housing-tube for the leads from the loop to said receiving apparatus, said tube being rotatable and supporting said loop; a control panel with leads for said radio receiving apparatus; a rotatable compass card concentric with said rotatable tube; operating means for rotating said tube; and a loop-compensator housing arranged concentrically with said rotatable tube and located below said tube-rotating operating means; said control panel and operating means and compass card being in positions wherein all are accessible to the operator in a given position; and the elements between said rotatable supporting tube and radio receiving apparatus being formed with openings for the passage of said loop-leads.

3. A radio direction finder which includes a rotatable loop aerial, and radio receiving apparatus cooperating therewith; a housing tube for the leads from the loop to said receiving apparatus said tube being rotatable and supporting said loop; an enclosing casing for said radio receiving apparatus and located below said tube and mechanically connected therewith; a control panel with leads for said radio receiving apparatus and forming a portion of said receiver casing; operating means for rotating said housing tube; and a loop-compensator housing arranged concentrically with said rotatable tube and located between said tube-operating means and receiver casing; said tube-operating means being located above said receiver casing and accessible to the operator in a position for manipulating the controls on said panel; the members between said tube and said encased receiving apparatus being formed with openings for the passage of the loop leads.

4. A radio direction finder which includes a rotatable loop aerial, and radio receiving apparatus cooperating therewith; a housing tube for the leads from the loop to said receiving apparatus said tube being rotatable and supporting said loop; a rotatable compass card concentric with said rotatable tube; a control panel with leads for said receiving apparatus; operating means for rotating said tube; and a loop-compensator housing located below said operating means; said compass card, control panel and operating means being in positions wherein both are accessible to the operator in a given position; and the members between said rotatable supporting tube and said receiving apparatus being formed with openings for the passage of said loop leads.

5. A radio direction finder which includes a rotatable casing for a loop aerial, and radio receiving apparatus cooperating with the loop; a rotatable housing tube for the leads from the loop to said receiving apparatus, said tube supporting the loop-casing and being in communication with the interior thereof; a control panel with leads for said receiving apparatus; operating means for rotating said tube; and a loop-compensator housing located below said operating means; the members below said tube being formed with openings for the passage of the loop-leads to the radio receiving apparatus; and said control panel and said operating means above the compensator housing being in positions wherein both are accessible to the operator in a given position.

6. A radio direction finder which includes a rotatable casing for a loop aerial, and radio receiving apparatus cooperating with the loop; a rotatable housing tube for the leads from the loop to said receiving apparatus, said tube supporting the loop-casing; an enclosing casing for said receiving apparatus and located below said tube and mechanically connected therewith; a control panel with leads for said radio receiving apparatus; and operating means for rotating said tube; said control panel and operating means being located in positions wherein both are accessible to the operator in a given position for manipulating the controls on said panel and rotating said tube.

7. A radio direction finder which includes a rotatable loop aerial, and radio receiving apparatus cooperating therewith; a rotatable housing tube for the leads from the loop to said receiving apparatus, said tube being rotatable and supporting said loop; an enclosing casing for said receiving apparatus and located below said tube and mechanically connected therewith; a control panel with leads for said receiving apparatus and forming a part of the casing therefor; operating means for rotating said tube; and a loop-compensator housing located below said operating means; the members between the tube and the receiving apparatus in its casing being formed with openings for the passage of the loop leads to said receiving apparatus; and said operating apparatus above the receiver casing, control-panel and compensator-housing being accessible to the operator in a position for manipulating the controls on the receiver panel.

8. A radio direction finder which includes a rotatable casing for a loop aerial, and radio receiving apparatus cooperating with the loop; a rotatable housing tube for the leads from the loop to said receiving apparatus, said tube supporting the loop-casing and being in communication with the interior thereof; an enclosing casing for said receiving apparatus and located below said tube and mechanically connected therewith; a control panel with leads for said receiving apparatus and forming a part of the casing therefor; operating means for rotating said tube and located above said receiver casing and control panel; a rotatable compass card arranged concentric with said rotatable tube and located below said operating means, but above said receiving apparatus; and a loop-compensator housing arranged concentrically with said rotatable tube and rotatable compass card, and located above said compass card but below said tube-operating means; the parts between the lower end of the tube and the receiving apparatus in the housing therefor being formed with openings for the passage of the leads from said tube to said receiving apparatus; and said tube-operating means above the compensator-housing, control-panel and compass-card being accessible to the operator in a position from rotating said compass card and manipulating the controls on said panel.

JOHN A. PROCTOR.